United States Patent [19]
Ahagon et al.

[11] 4,396,052
[45] Aug. 2, 1983

[54] RADIAL TIRE

[75] Inventors: Asahiro Ahagon, Hiratsuka; Norimichi Takanashi, Yokohama; Hiroshi Hirakawa, Isehara, all of Japan

[73] Assignee: The Yokohama Rubber Co., Ltd., Tokyo, Japan

[21] Appl. No.: 256,580

[22] Filed: Apr. 22, 1981

[30] Foreign Application Priority Data

Jun. 11, 1980 [JP] Japan .................................. 55-78746

[51] Int. Cl.$^3$ ........................ B60C 11/00; B60C 1/00; B60C 9/18
[52] U.S. Cl. ........................... 152/209 R; 152/361 R; 152/374; 525/236; 525/232
[58] Field of Search ............... 152/209, 330 R, 357 R, 152/360, 361 R, 374; 260/5; 525/232, 236–237, 241

[56] References Cited

U.S. PATENT DOCUMENTS 4,224,197 9/1980 Ueda et al. ........................... 152/374
4,261,403 4/1981 Imai et al. ............................ 152/374

FOREIGN PATENT DOCUMENTS 1166832 10/1969 United Kingdom .
1261371 1/1972 United Kingdom .
2046277 11/1980 United Kingdom .

OTHER PUBLICATIONS

Ambelang, J. C., "Compositional Variables Affecting Dynamic Properties of Tire Compounds", Journal of Elast. & Plastics, vol. 9, (Oct. 1977), pp. 384–394.

Primary Examiner—Edward C. Kimlin
Assistant Examiner—Lois E. Boland
Attorney, Agent, or Firm—Armstrong, Nikaido, Marmelstein & Kubovcik

[57] ABSTRACT

A radial tire having an under-tread layer between a cap tread and a breaker layer is disclosed. As the material for the cap tread, a rubber composition is employed which contains 0.5 to 1.6 parts by weight of sulfur per 100 parts by weight of starting rubber components consisting of 25 to 75 parts by weight of polybutadidne rubber having 65 to 90 mol % of 1,2-bonding units and 75 to 25 parts by weight of natural rubber and/or polyisoprene rubber, and which has elongation at break of at least 330% at 100° C. A rubber composition containing 1.6 to 10 parts by weight of sulfur per 100 parts by weight of rubber components is used for the under-tread layer.

2 Claims, 1 Drawing Figure

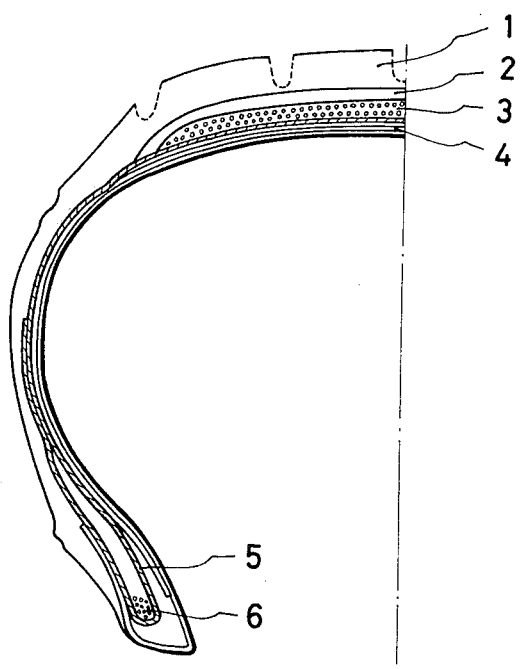

RADIAL TIRE

FIELD OF THE INVENTION

This invention relates to a steel belted radial tire (hereinafter referred to as radial tire) having excellent wet road braking performance and low rolling resistance.

BACKGROUND OF THE INVENTION

To conserve limited resources, reduction of fuel consumption of cars has become a strong social demand in recent years, and it is known that reduction of rolling resistance of a car tire is effective for this purpose. Since the tread portion contributes to the tire rolling resistance as much as about 50%, it is believed effective to improve the tread portion in order to reduce the tire rolling resistance.

It is believed that the rolling resistance of car tires results from energy loss of the tire materials due to repetitive deformation during driving.

On the other hand, braking performance of the tire on a wet road surface (hereinafter referred to as "wet road braking performance") must be high to ensure car safety. In respect to the tire materials, the wet road braking performance is determined by energy loss caused by frictional resistance as a result of deformation of the tread rubber material that follows up micro-fine unevenness of the road surface when brake is applied to tire and the tire is thus allowed to slide over the road surface.

As described above, both rolling resistance and wet braking performance greatly result from the energy loss of the tread material. Accordingly, reduction of the rolling resistance resulting from the tread portion of the tire and improvement in the wet braking performance are generally contradictory to each other. To balance both performances at a high level has been extremely difficult using the heretofore known starting rubber materials.

To overcome these problems, various polymers have been proposed as novel rubber materials for the cap tread.

Among these proposals, British Pat. Nos. 1,166,832 and 1,261,371 disclose that a tire having excellent wet road braking performance could be obtained if the tire uses for the cap tread a rubber composition consisting of at least one member selected from the group consisting of essentially amorphous polybutadiene rubber having a large content of 1,2-bonding units (hereinafter referred to as "V.BR"), natural rubber, polyisoprene rubber, styrene-butadiene copolymer rubber and polybutadiene rubber having a small content of the 1,2-bonding units, or a blend composition of these members. As disclosed especially in Japanese Patent Laid-Open No. 104343/1980, it is known that when a rubber composition consisting of 25 to 75% by weight of V.BR having 65 to 90 mol% of 1,2-bonding unit and 75 to 25% by weight of natural rubber and/or isoprene rubber is used for the tread, the low rolling resistance and the wet road braking performance can be balanced at a high level while escaping from the above-mentioned contradiction.

When the rubber composition consisting of the above-mentioned starting rubber components is used for the cap tread, however, machinability during tire production and driving durability of the resulting tire during driving become inferior to those of a tire using a general purpose cap tread material. Hence, the following improvements are to be made. Namely, if an ordinary two-split mold is employed at the vulcanization step during production of the tire using the rubber composition consisting of the above-mentioned rubber components, a part of the block of the rubber composition of the cap tread is likely to crack (hereinafter referred to as "rubber block crack") when the tire is withdrawn from the mold, or the rubber composition that has flowed into a vent hole is apt to be cut at its intermediate part, thereby causing vulcanization troubles. Moreover, during turning under highly severe conditions or driving on the rough road, the cap tread is damaged by chipping. Hence, durability of the rubber composition is inferior to that of the general purpose cap tread material.

SUMMARY OF THE INVENTION

It is therefore an object of the present invention to provide a radial tire free from the above-mentioned problems, more particularly, to provide a radial tire having excellent properties in respect to machinability during production, to driving durability and to wet road braking performance and also having low rolling resistance.

The radial tire in accordance with the present invention has the under-tread layer between the cap tread and the breaker layer composed of steel cords and covering rubber thereof, and is characterized in that:

(1) the cap tread consists of a rubber composition consisting of 25 to 75 parts by weight of polybutadiene rubber having 65 to 90 mol% of 1,2-bonding units, 75 to 25 parts by weight of natural rubber and/or polyisoprene rubber, and 0.5 to 1.6 parts by weight, based on 100 parts by weight of the above-mentioned starting rubber components, of sulfur, and has elongation at break of at least 330% at 100° C.; and (2) the under-tread layer consists of a rubber composition containing 1.6 to 10 parts by weight of sulfur blended to 100 parts by weight of rubber components (1.6 parts by weight < sulfur content ≦ 10 parts by weight).

DESCRIPTION OF THE DRAWINGS

The accompanying single FIGURE of the drawings is a partial sectional view of an example of the radial tire in accordance with the present invention.

DESCRIPTION OF THE PREFERRED EMBODIMENT (1) In the radial tire of the present invention, a specific rubber composition is used for the cap tread. This rubber composition is obtained by blending 0.5 to 1.6 parts by weight of sulfur to 100 parts by weight of a starting rubber composition that consists of 25 to 75 parts by weight of essentially amorphous polybutadiene rubber having 65 to 90 mol% of 1,2-bonding units and 75 to 25 parts by weight of natural rubber and/or polyisoprene rubber. The rubber composition has at least 330% elongation at break at 100° C. (in accordance with JIS K6301 other than the temperature condition). The use of this rubber composition for the cap tread is based upon the following findings.

(a) Relations were intensively examined between the kind and physical properties of starting rubbers to be used for the cap tread of a car tire, so-called "rubber block carck" occurring when a vulcanized tire is withdrawn from a mold during production of the tire and the chipping phenomenon of the tire during driving. As a result, it was found that problems of the tire during production or during driving such as the "rubber block crack" and chipping are closely related with the elongation at break of the cap tread rubber composition at high temperatures. In other words, it was found necessary that in order to avoid these problems, the elongation at break of the tire at a temperature within the range of 100 to 150° C. should exceed a certain critical value. To clarify the relation, Table 1 illustrates physical properties of eleven kinds of rubber compositions and the state of occurrence of "block crack" and chipping on the cap tread during turning on the asphalt road surface when each rubber composition is employed for a 165SR13 size radial tire.

words, neither "block crack" nor chipping during turning occurred when the cap tread rubber had elongation of at least 330% at 100° C. and at least 260% at 150° C.

From the above, in order to prevent occurrence of the troubles during manufacture as well as during driving, it is necessary that the cap tread rubber must have elongation of at least 330% at 100° C. and at least 260% at 150° C. Though both elongation at 100° C. and at 150° C. can be used as the scale of evaluation, measurement at 100° C. is preferred in view of stability of the test piece with respect to oxidative degradation during measurement.

(b) On the basis of the above-mentioned finding, extensive studies were carried out to obtain a rubber composition having elongation at break of at least 330% at 100° C. and not causing "rubber block crack" or chipping when used as the cap tread of a tire, such as a blend

TABLE 1

| | | cap tread rubber composition | | | | | | | | | | |
|---|---|---|---|---|---|---|---|---|---|---|---|---|
| | | A | B | C | D | E | F | G | H | I | J | K |
| | | starting rubber component | | | | | | | | | | |
| measuring temperature | rubber properties | NR[1] | NR/ BR[2] | NR/ VBR[3] | SBR[4] | SBR/ BR | NR/ SBR | NR/ VBR | SBR/ VBR | SBR | VBR/ BR | VBR |
| 25 | 100% stress (kg/cm$^2$) | 22 | 20 | 23 | 17 | 23 | 25 | 27 | 13 | 32 | 28 | 31 |
| | 300% stress (kg/cm$^2$) | 107 | 92 | 110 | 85 | 110 | 122 | 135 | 106 | 155 | 116 | — |
| | JIS hardness | 60 | 60 | 62 | 62 | 66 | 64 | 64 | 60 | 68 | 64 | 67 |
| | tensile strength (kg/cm$^2$) | 282 | 243 | 201 | 218 | 198 | 229 | 160 | 190 | 204 | 116 | 110 |
| | elongation (%) | 620 | 580 | 520 | 560 | 540 | 500 | 360 | 520 | 380 | 300 | 270 |
| | tear strength (kg/cm) | 77 | 68 | 62 | 64 | 70 | 67 | 52 | 50 | 61 | 48 | 41 |
| 100 | tensile strength (kg/cm$^2$) | 208 | 167 | 105 | 109 | 111 | 106 | 79 | 73 | 102 | 50 | 47 |
| | elongation (%) | 620 | 540 | 410 | 350 | 330 | 290 | 260 | 250 | 230 | 160 | 140 |
| | tear strength (kg/cm) | 70 | 51 | 41 | 31 | 35 | 42 | 28 | 20 | 26 | 25 | 17 |
| 150 | tensile strength (kg/cm$^2$) | 120 | 85 | 80 | 66 | 75 | 73 | 75 | 26 | 53 | 39 | 34 |
| | elongation (%) | 550 | 400 | 310 | 280 | 260 | 220 | 200 | 150 | 135 | 130 | 90 |
| | tear strength (kg/cm) | 45 | 35 | 29 | 22 | 29 | 25 | 25 | 15 | 15 | 14 | 12 |
| degree of "rubber block crack" of cap tread on the removal from a mold[6] | | N | N | N | N | N | S | M | M | M | L | L |
| degree of chipping during turning on the asphalten road surface[6] | | N | N | N | N | N | M | L | — | L | — | — |

Remarks:
(1) natural rubber RSS#3
(2) polybutadiene rubber, produced by Nippon Zeon Co., "Nipol BR1220"
(3) polybutadiene rubber having 80% 1,2-bonding units
(4) styrene-butadiene copolymer, produced by Nippon Zeon Co., Nipol SBR 1712
(5) Properties were measured in accordance with JIS K6301 except the measuring temperature.
(6) The tires used for the measurement were steel radial tires of a 165SR13 size and had the same specifications other than the cap tread. Further, symbols "L", "M", "N" and "S" for "degree of rubber block crack" and "degree of chipping" respectively denote "large", "medium", "nil" and "small".

It can be understood clearly from the results shown in Table 1 that there is obvious correspondence between the state of occurrence of "block crack" and chipping and the break properties of the rubber, especially the elongation at break at high temperatures. Neither "block crack" nor chipping occurred on the cap tread using a rubber composition having elongation at high temperatures that exceeds a critical limit. In other type rubber composition of Japanese Patent Laid-Open No. 104343/1980 having well-balanced, low rolling resistance and high wet braking performance and consisting of 25 to 75 wt.% of V.BR having 65 to 90 mol% of 1,2-bonding units and 75 to 25 wt.% of natural rubber and/or polyisoprene rubber. As a result, it was found that the blend amount of sulfur as the vulcanizing agent exerts significant influences upon elongation at break of the rubber composition consisting of the above-mentioned starting rubbers. In the rubber composition consisting of the above-mentioned starting rubbers, the smaller the sulfur content, the greater the elongation at break at a measuring temperature. Hence, the blend amount of sulfur is preferably smaller. If the sulfur content is below 0.5 parts by weight per 100 parts by weight of the starting rubber, however, the rolling resistance of the tire becomes high. For this reason, the sulfur content in the present invention is at least 0.5 parts by weight and at most 1.6 parts by weight. Preferably, the lower limit is 0.8 parts by weight and the upper limit is 1.6 parts by weight.

The blend amount of a vulcanizing accelerator is preferably smaller in order to increase elongation at break, but the influences of the vulcanizing accelerator are not so much great as those of sulfur. As the vulcanizing accelerator, it is preferred to blend 0.6 to 2.5 parts by weight of sulfenamide type or thiazole type compounds either alone or conjointly.

(2) The mating component to be blended with V.BR having 65 to 90 mol% of 1,2-bonding units must be natural rubber and/or polyisoprene rubber in order to balance the rolling resistance of the tire and its wet braking performance at a high level and to attain at least 330% elongation at break at 100° C. If styrene-butadiene compolymer rubber or polybutadiene rubber having up to 20 mol% of 1,2-bonding unit is alone selected as the component to be blended, it is not possible to balance both of the above-mentioned tire performance at a high level and to obtain elongation at break exceeding a necessary level. However, up to 40 wt.% of natural rubber and/or polyisoprene rubber can be replaced by styrene-butadiene copolymer rubber or by conjugated diene type rubber such as polybutadiene rubber having up to 20 mol% of 1,2-bonding units.

The V.BR to be used for the cap tread in the present invention can be prepared in accordance with the method disclosed in U.S. Pat. No. 3,301,840, by way of example. Namely, it is an essentially amorphous polybutadiene of high 1,2-bonding units that can be obtained by polymerizing 1,3-butadidne in a hydrocarbon solvent using an organic lithium compound as the polymerization catalyst in the co-presence of ether or amine as the 1,2-bonding unit adjusting agent at a temperature ranging from $-80°$ C. to $+100°$ C. The 1,2-bonding unit content in the resulting polymer can be determined by infrared spectral analysis employed generally in structural determination.

To the rubber composition for the cap tread in accordance with the present invention, 40 to 70 parts by weight, based on 100 parts by weight of the starting rubber components, of carbon black generally used for the tire tread and 0 to 40 parts by weight of process oil are blended. It is also possible to blend suitable additives in general such as an accelerator activator, an antioxidant, a processing aid, a scorch retarder, and so forth.

The rubber composition for the cap tread to be employed in the present invention has a low sulfur content which is out of the sulfur content of the rubber composition for the cap tread used for the conventional radial tires.

(3) The radial tire in the present invention has the under-tread layer between the cap tread and the breaker layer. This under-tread layer uses a rubber composition which contains sulfur in an amount from 1.6 parts by weight to 10 parts by weight (1.6 parts by weight < sulfur content ≦ 10 parts by weight) on the basis of 100 parts by weight of the rubber components, preferably from 1.8 to 10 parts by weight of sulfur.

When a steel cord is used as the reinforcing material of the breaker layer of the tire, a rubber composition for covering the steel cord has a high sulfur content in order to attain high bondability to the steel cord.

Accordingly, if the cap tread used in the present invention is brought into direct contact with the breaker layer, sulfur would migrate from the covering rubber layer of the breaker layer into the cap tread when the green tire is left standing or is vulcanized, with the consequence that the sulfur content decreases below a designed content of the covering rubber layer and bonding between the rubber composition and the steel cord decreases, thus causing a safety problem of the tire during driving. In the radial tire in accordance with the present invention, the above-mentioned under-tread layer is disposed between the cap tread and the breaker layer in order to eliminate this problem.

Except the sulfur content, there is no limitation to the rubber composition to be used for this under-tread layer, in particular, Namely, it may be the same as the convering rubber composition. In order to reduce the rolling resistance of the tire, however, the rubber composition preferably has Lüpke rebound of at least 65% at 70° C. Accordingly, the rubber components forming this rubber composition are not particularly restrictive, either.

The upper and lower limits of the sulfur content is stipulated to the range of 1.6 to 10 parts by weight for the following reason. If the sulfur content in the under-tread layer is less than 1.6 parts by weight, it is not possible to sufficiently mitigate migration of sulfur blended to the breaker-covering rubber layer into the under-tread layer so that adhesion between the rubber composition and the steel cord decreases to eventually deteriorate driving safety of the tire. On the other hand, if sulfur is added in an amount exceeding 10 parts by weight, the under-tread layer becomes hard so that crack resistance or burst resistance of the tire decreases, resulting eventually in troubles such as tread separation and driving safety of the tire. The presence of the under-tread layer mitigates migration of sulfur due to the difference in the sulfur content between the cap tread and the breaker covering rubber layer and makes it possible to maintain adhesion between the steel cord and the rubber at a high level.

The sulfur content in the breaker-covering rubber layer is generally in the range of 3 to 10 parts by weight on the basis of 100 parts by weight of rubber. As to the relationship of the sulfur contents between the under-tread layer and the breaker-covering rubber layer, the sulfur content in the breaker covering rubber layer may be greater or smaller than, or equal to, that of the under-tread layer, but the sulfur content in the breaker-covering layer is preferably greater.

The thickness of the under-tread layer may fall under the range of 0.5 to 3 mm.

The accompanying sole drawing is a partial sectional view of an example of the radial tire in accordance with the present invention, which radial tire consists essentially of the cap tread 1, the under-tread layer 2, the breaker layer 3 and the inner liner layer 4 and is equipped with a carcass ply 5 and a bead wire 6. Any sectional shape for under-tread layer 2 may be employed so long as it perfectly covers the surface of the breaker layer 3 on the cap tread side and so long as its thinnest portion has the thickness of at least 0.5 mm.

Hereinafter, the effects of the present invention will be described definitely by referring to embodiments thereof.

EMBODIMENT 1

The effectiveness of the rubber for the tire cap tread of the present invention, having excellent wet braking performance and low rolling resistance, in respect to troubles during production and the anti-chipping property during driving, will be definitely illustrated by referring to Examples 1 through 6 of the present invention and Comparative Examples 1 through 8 of Table 2.

Evaluation of the rubber composition for the cap tread was carried out in the following manner. Additives other than sulfur and a vulcanizing accelerator, and the starting rubber were kneaded using a B type Banbury mixer of a 1.8 l capacity, and sulfur and the vulcanizing accelerator were then added using a 6 inch roll. The mixture was then press-vulcanized at 160° C. for 15 minutes and was subjected to the property test, which was carried out in accordance with JIS K6301 except the temperature condition. The tensile test was carried out inside a thermostatic oven controlled to a predetermined temperature +1° C. after preheating the test specimen for 50 minutes at the temperature. The Lüpke rebound was measured inside a thermostatic chamber controlled to 25° C. ±1° C. after the test specimen was pre-heated for 50 minutes within a thermostatic oven controlled to predetermined temperature ±1° C.

nized on a two-split mold, the presence or absence of chipping of the cap tread when the tire was turned on an asphalten road surface, the degree of trouble, the rolling resistance on an indoor drum and the stop distance when four-wheel brake was applied on the asphalten road surface.

The rolling resistance in Table 2 is expressed in terms of indices of the values obtained by simply averaging the rolling resistance values at 40, 60, 80 and 100 Km/hour with respect to the value of Comparative Example 1 being 100. The wet braking performance is an index of the brake stop distance at the initial speed of 60 Km/hour with respect to the value of Comparative Example being 100.

TABLE 2

| | Experimental Example | Comp. 1 | Inv. 1 | Comp. 2 | Inv. 2 | Inv. 3 | Inv. 4 | Comp. 3 | Comp. 4 | Inv. 5 | Inv. 6 | Comp. 5 | Comp. 6 | Comp. 7 | Comp. 8 |
|---|---|---|---|---|---|---|---|---|---|---|---|---|---|---|---|
| | 80% V.BR | | 50 | 50 | 50 | 50 | 50 | 50 | 50 | 50 | 50 | 50 | 50 | 50 | 50 |
| | NR | | 50 | 50 | 50 | 50 | 50 | 50 | 50 | 25 | 30 | | | | |
| | IR | | | | | | | | | | 25 | | | | |
| | SBR | 70 | | | | | | | | | | 50 | 50 | | |
| | BR | 30 | | | | | | | | 20 | | | | 50 | 50 |
| | Zinc oxide | 3 | 3 | 3 | 3 | 3 | 3 | 3 | 3 | 3 | 3 | 3 | 3 | 3 | 3 |
| | stearic acid | 2 | 2 | 2 | 2 | 2 | 2 | 2 | 2 | 2 | 2 | 2 | 2 | 2 | 2 |
| | antioxidant[7] | 2 | 2 | 2 | 2 | 2 | 2 | 2 | 2 | 2 | 2 | 2 | 2 | 2 | 2 |
| | carbon black (N 339) | 60 | 60 | 60 | 60 | 60 | 60 | 60 | 60 | 60 | 60 | 60 | 60 | 60 | 60 |
| | aromatic oil | 15 | 15 | 15 | 15 | 15 | 15 | 15 | 15 | 15 | 15 | 15 | 15 | 15 | 15 |
| | vulcanizing accelerator[3] 1 | 1.2 | 1.7 | 1.1 | 1.2 | 1.7 | 0.9 | 1.2 | 1.2 | 1.7 | 1.7 | 1.2 | 1.7 | 1.2 | 1.7 |
| | 2 | | | | | | 0.8 | | | | | | | | |
| | 8 | | | 0.6 | | | | | | | | | | | |
| | Sulfur | 1.8 | 1.0 | 1.0 | 1.0 | 1.4 | 1.4 | 1.8 | 2.2 | 1.4 | 1.0 | 1.8 | 1.0 | 1.8 | 1.0 |
| rubber property | tensile strength (kg/cm$^2$) 25° C. | 198 | 201 | 180 | 205 | 195 | 204 | 176 | 160 | 192 | 187 | 190 | 214 | 116 | 157 |
| | 100° C. | 111 | 105 | 91 | 106 | 117 | 121 | 86 | 79 | 126 | 90 | 73 | 73 | 50 | 78 |
| | elongation (%) 25° C. | 540 | 520 | 350 | 560 | 440 | 460 | 370 | 360 | 430 | 440 | 520 | 610 | 300 | 500 |
| | 100° C. | 330 | 410 | 240 | 450 | 340 | 350 | 270 | 260 | 360 | 330 | 250 | 300 | 160 | 270 |
| | 300% stress (kg/cm$^2$) 25° C. | 110 | 110 | 124 | 107 | 121 | 116 | 111 | 135 | 116 | 108 | 106 | 76 | 116 | 101 |
| | JIS hardness (%) 25° C. | 60 | 62 | 62 | 61 | 63 | 62 | 62 | 64 | 62 | 60 | 60 | 57 | 64 | 60 |
| | Lupke rebound (%) 25° C. | 43 | 44 | 46 | 43 | 45 | 44 | 45 | 46 | 45 | 44 | 40 | 37 | 46 | 45 |
| | (%) 70° C. | 54 | 57 | 60 | 55 | 59 | 57 | 59 | 61 | 59 | 56 | 53 | 47 | 58 | 55 |
| tire property | rubber block crack at the time of vulcanization | nil | nil | | nil | nil | nil | M | | nil | nil | M | | L | |
| | chipping during turning | nil | nil | | nil | nil | nil | L | | nil | nil | — | | — | |
| | rolling resistance index[9] | 100 | 95 | | 98 | 91 | 96 | 90 | | 91 | 97 | 101 | | 93 | |
| | wet braking performance index[10] | 100 | 109 | | 108 | 110 | 109 | 109 | | 110 | 105 | 111 | | 98 | |

In some experimental examples, radial tires of a 165SR13 size having the same specification other than the cap tread rubber were produced using the cap tread rubber composition kneaded and mixed by a Bambury mixer of a 230 l capacity, in accordance with the method customarily employed in the tire production industry. The steel radial tires subjected to the test had such a construction in which the under-tread layer having Lüpke rebound of 70% at 70° C., was so disposed between the cap tread and the breaker layer as to perfectly cover the surface of the breaker layer on the cap tread side. This under-tread layer was a 1 mm-thick rubber layer consisting of 2.5 parts by weight of sulfur and 0.8 parts by weight of N-oxydiethylene-2-benzothiazole sulfen-amide as the vulcanizing accelerator per 100 parts by weight of the starting rubber components consisting of natural rubber and Nipol BR 1220.

The tire performances were measured as to rubber block crack of the cap tread when each tire was vulca- Remarks:
(7) N-1,3 dimethylbutyl-N'-phenyl-p-phenylenediamine
(8) vulcanizing accelerator 1: N-oxydiethylene-2-benzothiazole sulfenamide, vulcanizing accelerator 2: 2,2'-dibenzothiazyl disulfide vulcanizing accelerator 3: tetramethyl thiuram disulfide
(9) (rolling resistance of each tire)/(rolling resistance of Comparative Example 1) × 100
(10) (brake stop distance of Comparative Example 1/brake stop distance of each tire) × 100 Further, "Inv. 1" through "Inv. 6" are Examples 1 through 6 according to the present invention and "Comp. 1" through "Comp. 8" mean Comparative Examples 1 through 8, respectively. Also, symbols "L" and "M" for rubber block crack and chipping respectively denote "large" and "medium".

As illustrated in Examples 1 through 3 of the present invention, when the sulfur content is below 1.6 parts by weight per 100 parts by weight of the blend of V.BR and natural rubber, elongation at brake at 100° C. exceeds 330%, and neither "block crack" on the removal from a mold nor chipping during turning of the tire takes place.

On the other hand, if the sulfur content exceeds 1.6 parts by weight as is generally used in the cap tread as exemplified by Comparative Examples 3 and 4, elongation at break at 100° C. becomes smaller than 330%. This represents the occurrence of "block crack" and chipping of the tire. It can be understood by comparing Example 3 with Example 5 of the present invention that the mating rubber of the blend with V.BR may be either natural rubber or polyisoprene rubber, and equivalent performances can be obtained in either case. On the other hand, it can be understood from Comparative Examples 5 through 8 that if the styrene-butadiene copolymer rubber or butadiene rubber having up to 20 mol% of 1,2-bonding units is selected as the mating rubber of the blend for V.BR, it becomes impossible to obtain at least 330% elongation at break at 100° C. even if the sulfur content is reduced. By contrast, when up to 40 wt.% of natural rubber and/or polyisoprene rubber is replaced by conjugated diene type rubber, it is possible to obtain at least 330% elongation at break at 100° C. as can be appreciated from Example 6 of the present invention.

Examples 3 and 4 represent that if sulfenamide or thiazole type compounds are used as the vulcanizing accelerator, elongation at break and rebound value as the scale of the rolling resistance can be balanced at a high level. On the other hand, it can be understood from the comparison of Example 1 of the present invention with Comparative Example 2 that though the thiuram type vulcanizing accelerator increases the rebound value, it can not attain the elongation exceeding the minimum necessary level.

It is obvious from Examples 1 through 6 of the present invention that in comparison with the tires using the conventional cap tread, the tire in accordance with the present invention has low rolling resistance and wet braking performance that are balanced at a higher level.

Incidentally, when the cap tread layer of the tire in each Example was peeled along the breaker layer, the residual ratio of the steel cord-covering rubber of the breaker layer to the cord was 100% and hence, adhesion between the steel cord and the rubber was kept at a high level.

EMBODIMENT 2

As to the cap tread rubber used in Example 1 and 3 of the present invention shown in Table 2, the influences exerted by an under-tread layer upon adhesion between the steel cord and the rubber, when the under-tread layer of the following composition was inserted between the cap tread and the breaker layer composed of steel cords covered with rubber which effects rubber to mutual adhesion, are

| Composition: | |
|---|---|
| zinc oxide | 3 parts by weight* |
| stearic acid | 2 parts by weight* |
| carbon black (N330) | 50 parts by weight* |
| aromatic oil | 5 parts by weight* |
| N—oxy.diethylenebenzothiazole-2-sulfenamide | 0.8 parts by weight* |
| sulfur | 1.2, 1.8 or 2.5 parts by weight* |

*per 100 parts by weight of the starting rubber consisting of natural rubber and Nipol BR1200

The thickness of the adhesion rubber for covering the steel cord for the breaker material was 0.2 mm and the thickness of the under-tread layer was 0.5 and 1 mm. The tire size was the same as that used in Example 1, that is, 165SR13. The cap tread portion of the vulcanized tire was peeled along the breaker layer, and the residual ratio of the covering rubber was determined for each of 10 steel cord in order to evaluate adhesion using their mean value.

TABLE 3

| Rubber composition for cap tread | Rubber composition for undertread layer | | Residual ratio of covering rubber on steel cord (%) | Experimental Example |
|---|---|---|---|---|
| | Sulfur content (parts by weight) | Thickness (mm) | | |
| Rubber composition of Example 1 of this invention shown in Table 2 | 1.2 | 0 | 68 | Comp. Ex. 9 |
| | | 0.5 | 70 | Comp. Ex. 10 |
| | | 1.0 | 65 | Comp. Ex. 11 |
| | 1.8 | 0.5 | 95 | This Invention 7 |
| | | 1.0 | 98 | This Invention 8 |
| | 2.5 | 0.5 | 100 | This Invention 9 |
| | | 1.0 | 100 | This Invention 1 |
| Rubber composition of Example 3 of this invention shown in Table 2 | 2.5 | 0 | 78 | Comp. Ex. 12 |
| | | 0.5 | 100 | This Invention 10 |
| | | 1.0 | 100 | This Invention 3 |

As can be seen clearly from Comparative Examples 9 and 12 of Table 3, when the cap tread to be used in the present invention is brought into direct contact with the breaker layer, adhesion between the steel cord and the rubber decreases to considerable extents. It can be understood from Comparative Examples 10 and 11, that if the sulfur content of the under-tread layer is 1.2 parts by weight, the effect of interposition of the under-tread layer upon adhesion can not be observed. On the other hand, if the sulfur content of the under-tread is within 1.8 to 2.5 parts by weight, adhesion can be kept at a high level as can be seen from Examples 1, 3 and 7 through 10 of the present invention. It is thus clarified that the construction, in which the under-tread layer having a thickness of at least 0.5 mm and containing at least 1.6 parts by weight of sulfur per 100 parts by weight of the starting rubber is interposed between the cap tread and the breaker layer, is effective for maintaining adhesion between the steel cord and the rubber and for enhancing the tire safety during driving.

What is claimed is:

1. A radial tire having an under-tread layer interposed between a cap tread and a breaker layer wherein:
    (a) said cap tread consists of a rubber composition having an elongation at break at 100° C. of at least 330% and containing 0.5 to 1.6 parts by weight of sulfur based on 100 parts by weight of starting rubber components, said starting rubber components consisting of 25 to 75 parts by weight of essentially amorphous polybutadiene rubber having 65 to 90 mol% of 1,2-bonding units and 75 to 25 parts by weight of natural rubber and/or polyisoprene rubber;
    (b) said under-tread layer consists of a rubber composition containing 1.6 to 10 parts by weight of sulfur based upon 100 parts by weight of rubber components; and
    (c) said breaker layer contains 3 to 10 parts by weight of sulfur on the basis of 100 parts by weight of rubber component.

2. The radial tire as defined in claim 1 wherein the thickness of said under-tread layer is 0.5 to 3 mm.

* * * * *